July 15, 1969  S. O. S. STARK ET AL  3,455,214

METHOD FOR MANUFACTURING PACKAGING BLANKS FROM WEB MATERIAL

Filed Aug. 11, 1967  3 Sheets-Sheet 1

INVENTORS
Sven Olof Sören Stark
Thorsten Lennartson Lindh

BY *Pierce, Scheffler & Parker*
ATTORNEYS

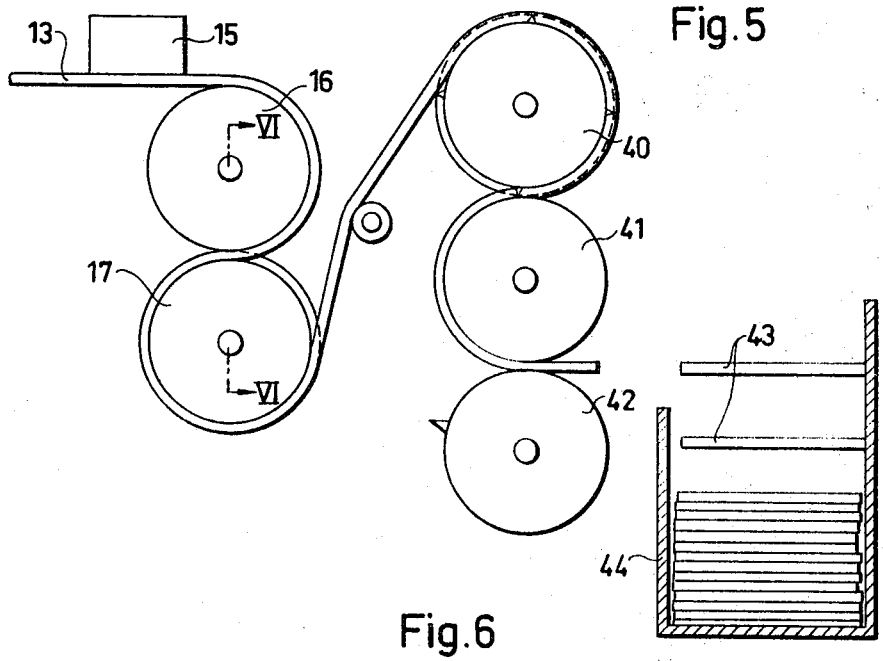
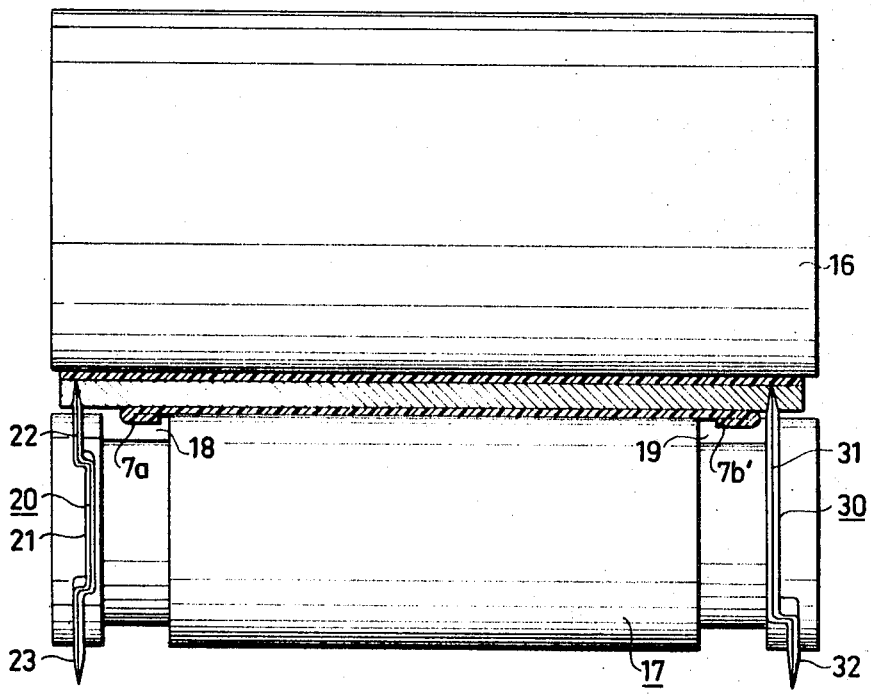

July 15, 1969    S. O. S. STARK ET AL    3,455,214
METHOD FOR MANUFACTURING PACKAGING BLANKS FROM WEB MATERIAL
Filed Aug. 11, 1967    3 Sheets-Sheet 3

INVENTORS
Sven Olof Sören Stark
Thorsten Lennartson Lindh

BY Pierce, Scheffler & Parker
ATTORNEYS

United States Patent Office 3,455,214
Patented July 15, 1969

3,455,214
METHOD FOR MANUFACTURING PACKAGING
BLANKS FROM WEB MATERIAL
Sven Olof Sören Stark, Sodra Sandby, and Thorsten
Lennartson Lindh, Lund, Sweden, assignors to AB
Tetra Pak, Lund, Sweden, a Swedish company
Filed Aug. 11, 1967, Ser. No. 660,094
Claims priority, application Sweden, Aug. 23, 1966,
11,334/66
Int. Cl. B31b 1/18
U.S. Cl. 93—36                                    4 Claims

ABSTRACT OF THE DISCLOSURE

A method of manufacturing packaging blanks, and particularly such blanks as will form so-called gable top containers for liquids starts with a roll of paper board to one side of which is bonded a plastic layer, the bond being continuous throughout the area of the plastic layer. A similar layer of plastic is bonded to the other side of the paper board but predetermined edge portions of this latter plastic layer corresponding to edge portions of certain in-folded panels of the gable top are left unbonded, are then folded back temporarily to permit the corresponding edge portions of the paper board to be cut away and are then unfolded to their original positions so as to cover and block off and prevent absorption of liquid into the adjacent cut surfaces of the paper board.

---

The present invention relates to the packaging art and particularly to a method of manufacturing packaging blanks starting from a web-shaped board—or similar rather stiff web-shaped backing material which on one side entirely or partly has been coated with a plastic or a comparable heat-sealable and liquid-tight material, said coating material within certain regions being not bonded to the said backing material.

The invention is more closely intended to be used for the manufacture of blanks for so called gable top containers, i.e. the kind of packages which is shown by way of example in the Australian Patent No. 225,010, but is most usable also for the manufacture of other packages of the capsule type.

Capsule type containers intended for liquids are nowadays generally made from board which on the surface intended to define the inside of the container (and preferably also on its outer surface) has been coated with a liquid-tight and heat-sealable layer of plastic, e.g. polyethylene. A method of manufacturing the blanks includes the steps of first laminating the material; giving it a creasing line pattern; and punching out the blanks to receive the desired shape. According to this method all edges of the punched out blanks will show a section of the backing material lamina. Under the presumption that no additional sealing tapes or coatings are applied to the edge zones, and that the backing material is fibrous, the finished container will on its inside exhibit raw areas within which the fibres of the backing material are exposed to the container interior. These fibres will absorb liquid whereby the container becomes moistened and loses its tightening ability.

A method of preventing from this non-desired effect is shown in the Swedish Patent No. 200,214. According to this patent first a board blank is punched out to receive a desired shaped whereupon it is lined with an inner bag of a heat-sealable plastic material which projects beyond the upper end of the board-capsule. The projecting plastic material effectively improves the tightening features of the container therein that the above mentioned liquid-absorbing cut-edges are eliminated. However, the method involves considerable practical problems that are to be solved. The patent thus does not give any solution to the problem of making the manufacture continuous which probably is due to the well-known difficulties regarding coating a web-shaped paper- or board material with plastic in such a manner that the plastic lamina will project beyond the edges of the said web-shaped material.

The art which in accordance with the present invention is intended to be used for the manufacture of the blank starting material in a rotary system, i.e. completely continuous, and which briefly has been mentioned in the preamble to the specification has in its basic principles been described in the British Patent No. 940,367. According to this patent a web is in a conventional manner coated with a plastic, the plastic, however, within the edge zones being prevented to adhere to the web. The composite material that is obtained and which consists of a backing material and a coating material might be said to define the starting material in the method according to the present invention, which is characterized therein that the non-bonded portions of the coating material are folded aside, whereupon certain portions of the backing material are punched out within the regions where the coating material has been folded aside, so that the finished blanks, when the folded aside coating portions have been brought back to their original positions, will show edge portions which within certain regions consist of a composite material and within the remaining edge portions of merely the coating material.

The invention will now be more closely described with reference to the accompanying drawings, in which FIG. 1 schematically illustrates a method for the production of the composite material, which is intended to define the starting material in the method according to the invention;

Figure 7:
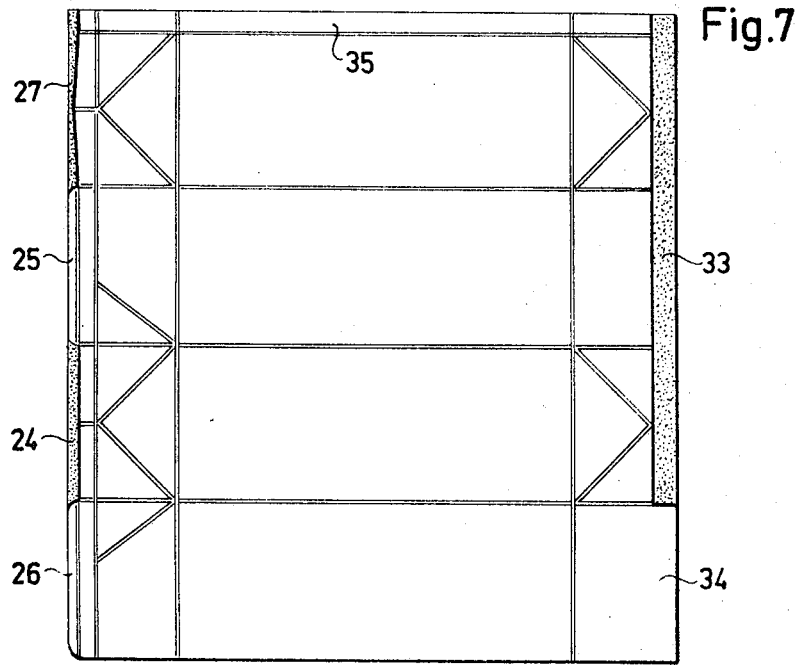

FIG. 5 schematically shows the method and the equipment required for the performance of the method in accordance with a preferred embodiment of the invention;

FIG. 6 is a section along the line VI—VI in FIG. 5 showing a rotary punching device that is used at the carrying out of the present method;

FIG. 7 shows the finished capsule blank; and

Figure 8:
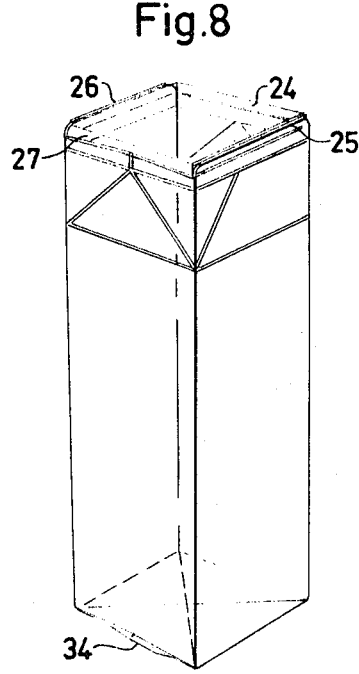

FIG. 8 finally shows the erected container which has been closed at its bottom but is still open at its top.

Figure 1:
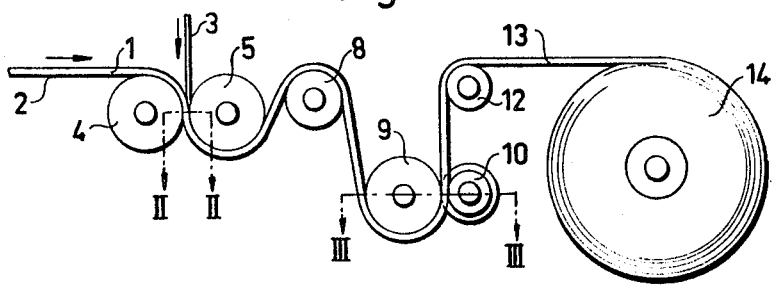

Referring to FIG. 1, numeral 1 designates a web-shaped material of a rather stiff kind, preferably paper board, which on the surface intended to define the outside of the finished containers has been provided with a plastic coating 2. The other surface of the composite web-shaped backing material 1, 2 is coated with a plastic lamina 3 which is extruded through an extruder nozzle not shown in the drawing. The uniting of the web material 1, 2 and the plastic film 3 is provided therein that the two materials are rolled together between a pressure roller 5 and a counter action roller 4 made by way of example from rubber. The coating material now has to be prevented from adhering to the backing material within at least a number of longitudinal zones. This can be achieved therein that the backing material within these zones are covered with an anti-adhesive agent before it is coated with the plastic.

Figure 2:
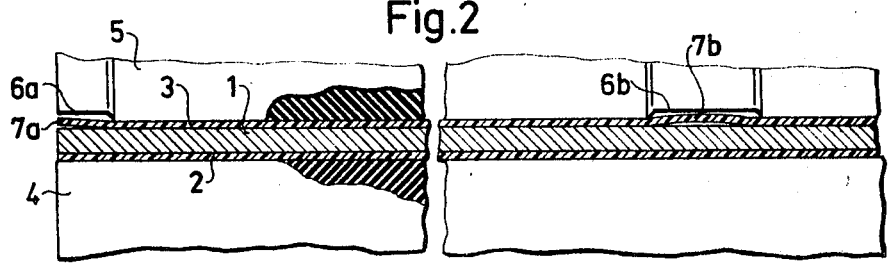
FIG. 2 is a section along the line II—II in FIG. 1.

Preferably the adherence, however, is prevented therein that the rubber roller 5, see the section in larger scale in FIG. 2, has been provided with annular recesses 6a, 6b corresponding to the desired adhesion-free zones. Due to the fact that no or possibly a very reduced pressure is obtained between the plastic film and the carrier material within the regions of the recesses it has proved that the rollers within the said recesses completely have lost their ability of effectively uniting the coating material and the carrier material. One has thus easily but nevertheless effectively obtained the same results as when applying a special anti-adhesive agent within the regions in question.

Figure 3:
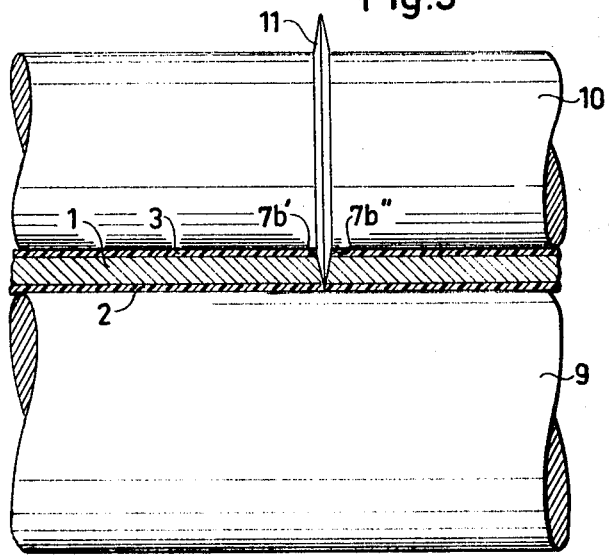
FIG. 3 is a section along the line III—III in FIG. 1.

The rubber roller 5 has been provided with peripheral recesses 6a and two recesses 6b arranged with uniform pitch on the cylindrical surface of the roller and which have a breadth twice the breadth of the peripheral recesses. The object of such arrangement is to make it possible to receive three equal material rolls from each web. Thus the coated material is cut up in three equal breadths by cuts centrally through the two adhesive-free middle zones; see FIG. 3 where numeral 10 designates a cutting roller having a circular knife 11, and where numeral 9 designates a counteraction roller. As a result one will obtain three equal breadths, the edges of which show non-adhering plastic strips. The section through a finished material 13 in FIG. 4 thus shows a strip 7a obtained by means of a peripheral recess 6a, and a strip 7b' corresponding to half the breadth of a central recess 6b. The portions 7b' and 7b'', FIG. 3, taken together correspond to the non-bonded plastic portion 7b, FIG. 2. In FIG. 1 numerals 8 and 12 finally designate two bending rollers and numeral 14 the finished material rolls which constitute starting materials for practicing the method according to the invention which will be described in the following.

Figure 4:
FIG. 4 shows a section through the composite web-shaped starting material perpendicularly to the longitudinal direction of the web. (In all the figures the thickness of the materials have been considerably magnified.)

As a basic material for practicing the method according to the invention it is also possible to use a material which has been provided with strips welded to the two edge portions and corresponding to the strips 7a and 7b' in FIG. 4. However, the described manner of preparing the starting material should be preferable due to its simplicity.

The continued procedure starts therein that the material 13 is unwound from a material supply roll which is not shown in FIG. 5. In a device 15 the two non-bonded strips 7a and 7b' are folded aside, e.g. by means of suction nozzles or by means of fixed bars. It is thereupon possible to punch away parts of the edge portions of the backing material 1, 2 without at the same time damaging the coating material portion which have been folded aside, i.e. the strips 7a and 7b'. The punching operation is carried out by means of a rotating punching device 17 which by means of its knives 20 and 30, FIG. 6 severs continuous edge strips in the gap between the rotating punching roller 17 and a counteraction roller 16, while the edge strips 7a and 7b' are folded aside in annular recesses 18 and 19 respectively provided for this purpose.

As is apparent from FIG. 6 the knives 20 and 30 have irregular shapes. The parts 21, 22, 23 of the knife 20 thus are provided to punch out the portions 24, 25 and 26 respectively of the container blank shown in FIG. 7. The portion 27 is punched out from a portion of the knife not visible in FIG. 6. When the strip 7a is permitted to re-adopt its original position the punched out regions 24 and 27 will be filled by coating material which in the finished container prevents liquid from being absorbed into the cut surfaces of the backing material. Coating material eventually projecting might be cut away in a later operation. It is also possible to place the outer portions 22 and 23 of the knife 20 edge to edge with the material to be prepared. One can possibly also permit the coating material at the finished blank to project slightly beyond the carrier material in the regions 25 and 26.

In an analogous manner the section 31 of the knife 30 punches out that portion which in FIG. 7 has been designated by numeral 33, while the knife section 32 corresponds to the portion 34 of the finished blank.

The material thus punched but still continuous is hereupon treated by means of a stamping roller 40 acting against a counteraction roller 41 so that it will receive the crease line pattern shown in FIG. 7. Finally the web material is severed by means of a rotary cutting device 42. Possibly projecting coating material is removed at the same time. The finished blanks 43 are collected in a collecting box 44.

FIG. 8 finally shows the erected, bottom-closed package container still open at its upper end.

Of course it is also desirable to tighten the longitudinal seal of the package container, i.e. the joint which is created by the overlapping flap, FIG. 7. Also this object can be realized according to the principles of the invention. Herein the rubber roller 5, FIGS. 1 and 2, is provided with a straight recess parallel to the roller axis. When the material in the final operation is cut off by means of the rotary cutting device 42 there will be established a free non-adhering strip of the coating material in the region of the overlapping flap 35. This strip can be folded in connection with the raising up of the blank, and as at the same time the overlapping flap is placed on the outer side of the container the inner longitudinal strip will—after having been secured to the inner surface of the container wall—effectively tighten the longitudinal joint of the container.

We claim:
1. A method of manufacturing packaging blanks starting from a web-shaped board or similar rather stiff web-shaped single or composite backing material (1, 2) which on one side entirely or partly has been coated with a plastic or a comparable heat-sealable and liquid-tight material (3), said coating material within certain regions (7a, 7b') being not bonded to the said backing material, characterized therein that the non-bonded portions (7a, 7b') of the coating material are folded aside, whereupon certain portions of the backing material are punched out within the regions where the coating material has been folded aside, so that the finished blanks, when the folded aside portions have been brought back to their original positions, will show edge portions that within certain regions (25, 26, 34) consist of a composite material and within the remaining edge portions (24, 27, 33) of merely the coating material.

2. A method according to claim 1, characterized in that the non-bonded regions are defined by the edge-zones of the coated material (13), and in that the non-bonded portions of the coating material in the shape of strips continuously are folded aside by means of suction nozzles (15).

3. A method according to claim 1, characterized in that the non-bonded regions also include a narrow zone (35) transverse to the longitudinal direction of the web.

4. A method according to claim 1, characterized in that the said strips (7a, 7b') are folded aside by means of a bar arrangement (15).

References Cited

UNITED STATES PATENTS 2,682,208   6/1954   Monroe et al. _____ 93—58.2 X
2,984,161   5/1961   Cook et al. _____ 93—36.6 X
3,114,300   12/1963  Bianchi _____ 93—36.6

BERNARD STICKNEY, Primary Examiner